J. F. FROMM.
FISH AND FRUIT NET.
APPLICATION FILED JULY 14, 1909.
956,803.
Patented May 3, 1910.
3 SHEETS—SHEET 1.
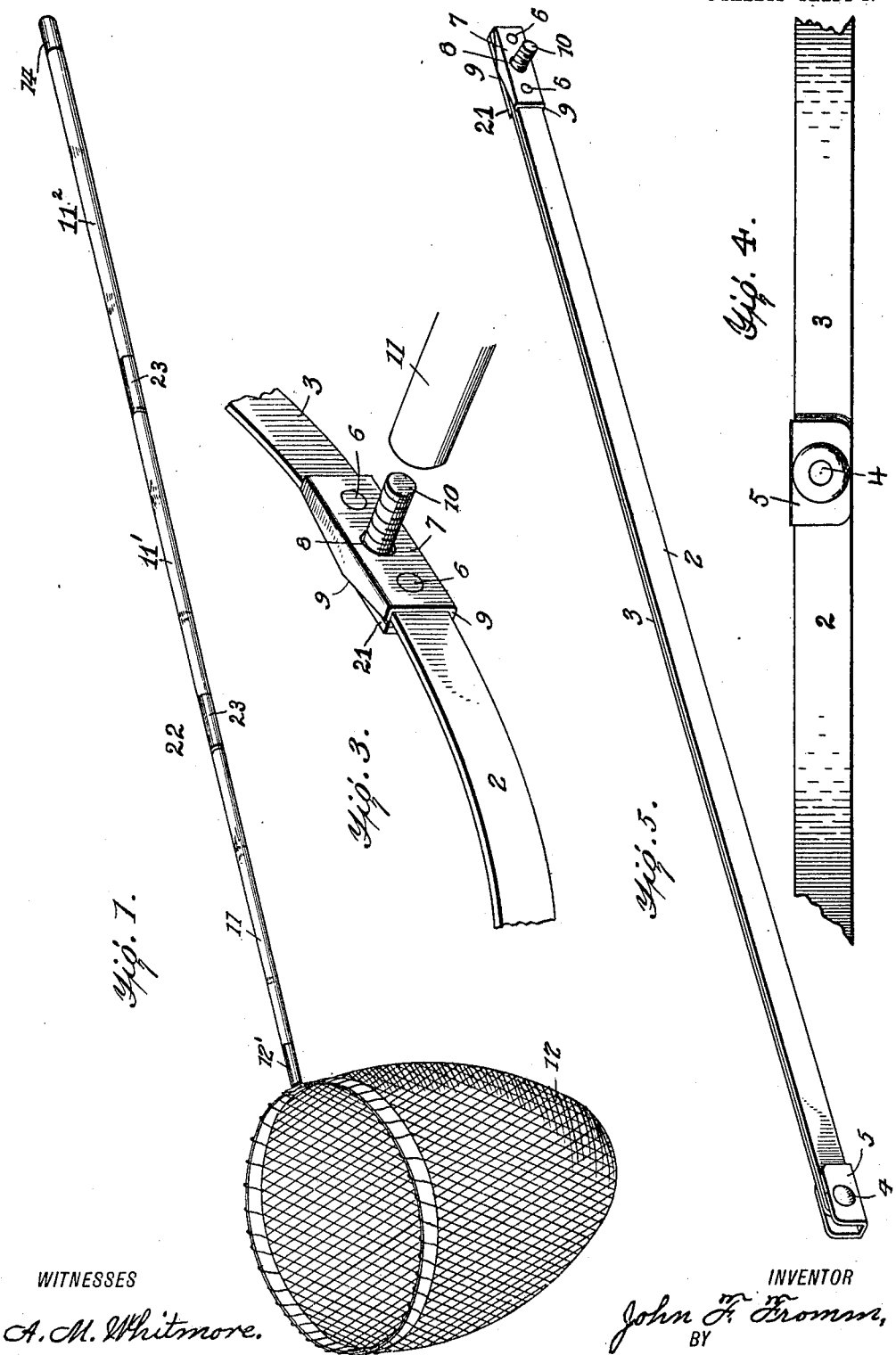
WITNESSES
A. M. Whitmore.
C. E. Oendeland.
INVENTOR
John F. Fromm,
BY
E. B. Whitmore,
ATTORNEY J. F. FROMM.
FISH AND FRUIT NET.
APPLICATION FILED JULY 14, 1909.
956,803.
Patented May 3, 1910.
3 SHEETS—SHEET 2.
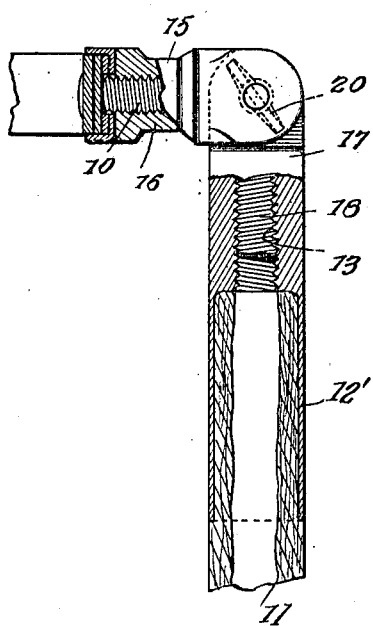
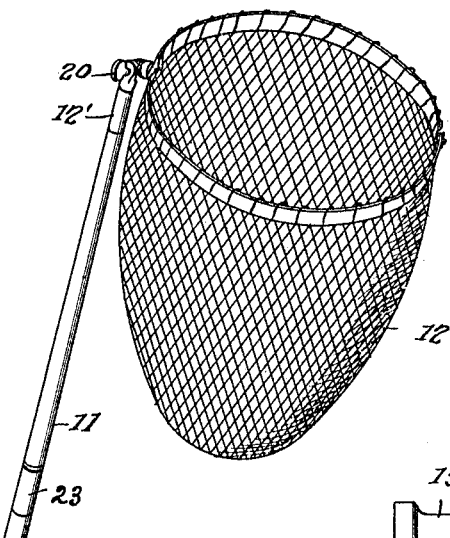
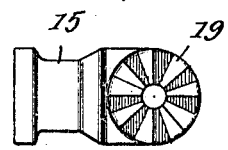
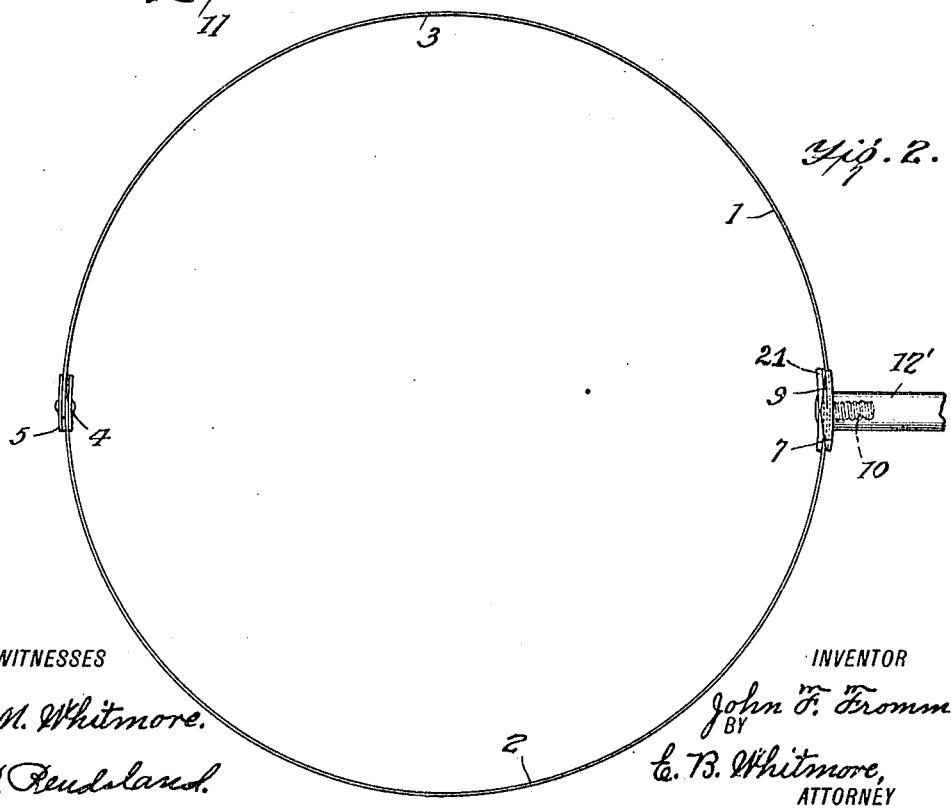
WITNESSES
A. M. Whitmore.
E. E. Reudsland.
INVENTOR
John F. Fromm,
BY
E. B. Whitmore,
ATTORNEY J. F. FROMM.
FISH AND FRUIT NET.
APPLICATION FILED JULY 14, 1909.
956,803.
Patented May 3, 1910.
3 SHEETS—SHEET 3.
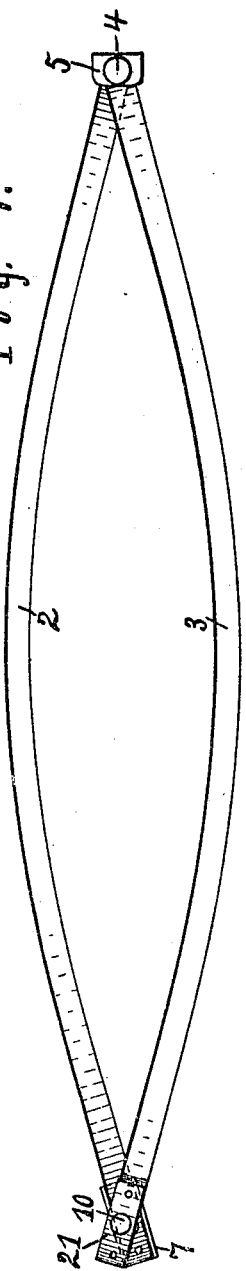
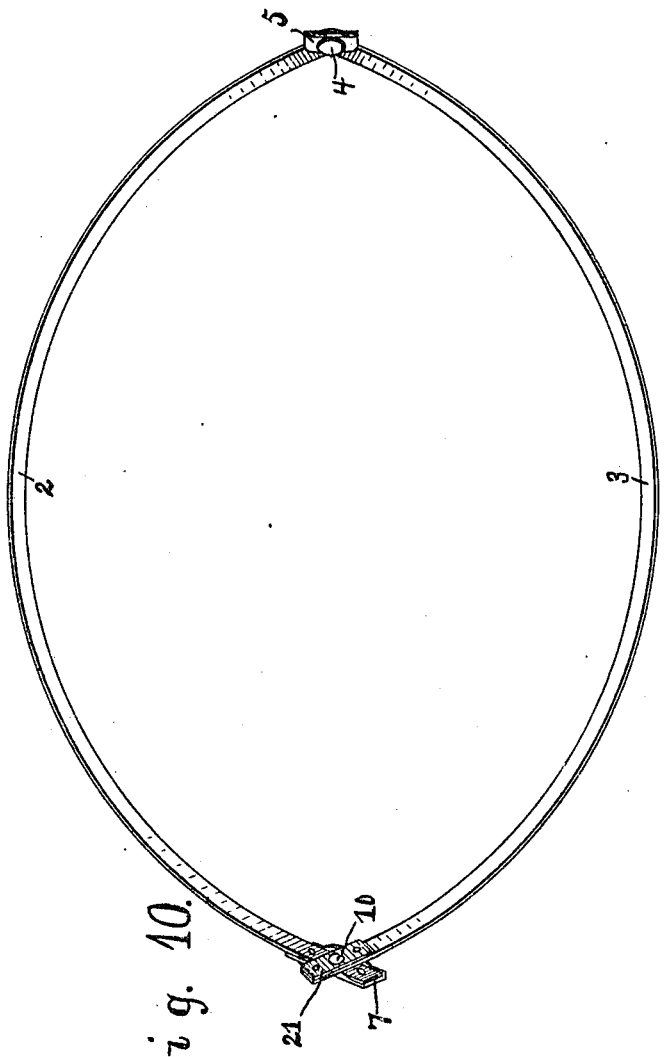
Attest:
A. M. Whitmore.
C. C. Rendsland.
Inventor:
John F. Fromm,
by E. B. Whitmore, Atty.

UNITED STATES PATENT OFFICE.

JOHN F. FROMM, OF ROCHESTER, NEW YORK.

FISH AND FRUIT NET.

956,803.  Specification of Letters Patent.  Patented May 3, 1910.

Application filed July 14, 1909. Serial No. 507,646.

*To all whom it may concern:*

Be it known that I, JOHN F. FROMM, of Rochester, in the county of Monroe and State of New York, have invented a new and useful Improvement in Fish and Fruit Nets, which improvement is fully set forth in the following specification and shown in the accompanying drawings.

This invention relates to certain new and useful improvements in nets, designed as a fish net, commonly called a landing net or dip net, for catching fish and landing them upon the shore or in a boat, or otherwise, or for use in catching fruit picked from trees or in which the fruit may be dropped from the tree to prevent injury thereto, and for various other uses.

The present invention has for its objects among others to provide a simple, yet efficient collapsible-hoop net designed for either of the purposes above described, or for any other purposes to which it may be desired to put the same. I provide means for connecting the hoop of the net with the handle, whereby the net may be held at the desired angle with relation to the handle, to accommodate the same to any of the varying conditions under which it is desired to use the net. The hoop also is of novel construction, permitting of its being collapsed to apply the netting and for conveniently packing and carrying, or turned into a circular or hoop form, the connections being such that lateral motion of the sections upon each other either when in their collapsed or circular form is prevented and all of the desired advantages are attained.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a perspective view showing the device as constructed for use as a dip or landing net. Fig. 2 is an enlarged plan view of the hoop showing a portion of the handle connected therewith. Fig. 3 is a perspective detail, on an enlarged scale, showing the united ends of the sections of the hoop, and the coöperating end of a section of the handle. Fig. 4 is an inner elevation of parts of the hoop at the pivot joint. Fig. 5 is a perspective view of the hoop sections in their collapsed condition, ready for storage or transportation. Fig. 6 is a perspective showing the net as adapted for gathering fruit and for other uses. Fig. 7 is an enlarged detail with portions broken away and parts in section showing the coupling between the handle and the hoop adapting the latter to be turned at different angles. Fig. 8 is a side elevation of one portion or member of the adjustable coupling. Fig. 9 is a plan of the hoop sections slightly opened as in the act of forming the complete hoop. Fig. 10 is a similar view of the sections farther expanded to form the hoop.

Like numerals of reference indicate like parts throughout the several views.

Referring to the drawings, 1 designates the hoop for holding the net 12, which is made of two sections 2 and 3, preferably of spring steel, normally straight, as seen best in Fig. 5, and around which the net may be rolled when the device is packed up or out of use. At one end the sections or strips 2 and 3 are riveted together, as seen at 4, the connection being such as to form a permanent though movable joint.

5 is a channel piece of sheet metal covering the overlapped pivotally united ends of the two sections or strips 2 and 3, being pierced by the rivet 4, as seen clearly in Figs. 4 and 5. At the opposite end of the section or strip 2, there is secured, by suitable rivets 6, a small rectangular plate 7, see Figs. 3 and 5, provided with a circular opening 8 and with top and bottom flanges 9, as shown, to cover the edges of the overlapped end of the other section or strip 3. This end of the latter strip is provided with a fixed short stubbed screw 10 which is adapted to pass loosely through and continuously occupy said opening 8, the sections 2 and 3 not being intended to be detached thereat except to receive the net as will be presently described. To form these two sections into a hoop at any time or to give them a complete circular form they are held in the hands with the net 12 pending and the screw 10 turned away from the operator. In this position the sections are slightly bent at the middle giving them a bowed form concave toward the person holding them and then spread apart edgewise, as indicated progressively in Figs. 9 and 10, and finally assuming a complete circular form as shown in Fig. 2, the sections during this operation turning pivotally on the rivet 4 at one end and on the freely fitting screw 10 at the opposite end, the sections being held continuously together at said end by the screw 10.

The construction and arrangement of the parts by means of which two normally straight equal sections 2 3 of elastic metal placed side by side and joined at their ends may, without being detached at either end, be conveniently bent to form a complete circle or hoop I regard as the most essential feature of this invention. The screw 10 has its head rigidly embedded in a rectangular piece or plate 21, Figs. 2, 3, 5, 9 and 10, permanently secured to the section 3, of about the length of the plate 7, and when the sections are turned into a circular form, as stated, the plate 21 becomes directly reversed in its position between the flanges 9 of the plate 7 from that occupied when the sections are straight or in their collapsed form as appears in Fig. 5, this being accomplished without the sections being detached, the screw 10 continuously occupying and turning in the opening 8, as above stated.

When the two sections are in the form of a hoop they occupy a plane, and cannot be turned farther than to a plane on account of the form of the member 5, as appears clearly in Figs. 3 and 4, the form of the member 5 being clearly shown in Fig. 5. When the sections 2 and 3 are bent to a circular form the first section 11 of a pole or handle 22 is screwed onto the outwardly projecting end of the screw 10, serving to hold the ends of the hoop sections rigidly together, as seen in Fig. 2, and in position to be thus screwed on in Fig. 3. The net 12 may be attached to the hoop sections in any of the well-known ways, but as preferred and shown it is slipped equally onto the two sections, (temporarily released at the end carrying the screw 10,) the sections being passed through the series of loops or interstices at the mouth of the net.

The handle or rod 22, Fig. 1, for use with the net may be of any of the well-known kinds but I prefer to form it of slightly tapered sections 11, 11′, 11², each armored or tipped with metal at each end, and detachably and telescopically joined, the tip 12′ at the small end of the first section 11 being internally threaded to receive the free end of the screw 10, as above stated. The net may be used either with one, two or three sections of the handle, as the case may be. The tips 23 at the small ends of the sections 11′ and 11² respectively are in the form of extended open thimbles or cylinders to tightly telescope respectively upon the tips at the large end of the sections 11 and 11′ these latter tips together with the final tip 14 being all closed at their outer ends and rounded, with smooth surfaces, so as to be comfortably used and conveniently handled whether all three sections are employed at any time or only one or two, the large ends of all the handle sections being what is known as "butt finish".

When the first section 11 of the handle is screwed to place on the screw 10 it serves to hold the sections of the hoop permanently to place in circular form. Thus put together, as seen in Fig. 1, there is provided a dip net for catching fish, crabs, etc., and landing them upon the shore, in a boat or otherwise, the upturned edges or flanges 9 of the plate 7 receiving between them the coacting end of the other section having the screw, serve to prevent lateral motions of the sections upon each other when joined to form a hoop, keeping them in a plane, as will be readily understood by referring to Fig. 3.

In order to adapt the net thus constructed for other uses, such, for example, as for the purpose of catching choice fruit clipped from trees, or in which to drop selected fruit from the tree, I provide a jointed coupling or knuckle. One section 15 of this coupling or knuckle is screw-threaded internally, as seen at 16, and is adapted to be screwed directly onto the screw 10 of the hoop section, as seen clearly in Fig. 7. The other portion 17 of the said coupling or knuckle is provided with a projecting screw 18 similar to the screw 10, onto which the first or smallest handle section 11 is designed to be screwed. The contiguous flat faces of the two sections of this joint or coupling are radially corrugated, as seen at 19, and these corrugations may be of any desired number.

A set-screw 20 is provided passing freely through one of the overlapping portions of the coupling or knuckle and having threaded engagement with the other so that by tightening the screw, the two sections of the coupling may be firmly held in position when set at any desired angle. By means of this coupling, the rod or handle may be either in the plane of the hoop or bent at either side of said plane, as may be necessary in different cases or for different uses.

A convenient form of construction is to have these corrugations regularly spaced at 45° apart so that the handle may be turned and held in the plane of the hoop or at right angles with the plane of the hoop, or at an angle of 45° from said plane on either side. Other angles, however, may be sometimes desirable, in which case the corrugations will be differently disposed.

Ordinarily in fishing, the rod would be in the plane of the hoop, as shown in Fig. 1, where being used to land the fish. But, if the device is used in the matter of collecting fruit, or for similar uses, the handle would be in position at right angles with the plane of the hoop, or at 45° therefrom, so that when reaching upward for the fruit, the hoop would be horizontal, with the net pending. Or, if one were fishing, as, for instance, close down by the side of a pier or other body, or reaching downward into the water for other purposes, the hoop would be placed preferably at right angles to the handle and in substantially a horizontal position when the handle was extended practically vertically downward. In all these three cases, the hoop would be, preferably, horizontal whether the handle be directed upward or downward.

When the hoop sections are being spread at the middle or sprung apart in the act of forming the hoop, as above set forth, and shown in Figs. 9 and 10, they resist this action by an elastic force, tending to spring shut or to resume their normal straight forms. This tendency of the sections to thus straighten out is desirable and is taken advantage of as it serves to automatically keep the mouth of the net normally closed when only partially opened. At times when hunting or fishing in boats it is convenient to temporarily use the net as a game bag in which to hold fish or other game caught. For example, when fishing as with a hook from a boat, the net without the pole may be attached to an oar-lock by means of the elastic hoop sections and pend in the water at the side of the boat to conveniently receive the fish as caught. When it is wished to drop a fish into the pending net the sections are temporarily sprung apart, as shown in Fig. 9, which immediately spring back and close the mouth of the net when again released. Thus the fish are securely confined, and held in the water while the fishing proceeds. It is to be further noted, also, that this particular elastic action of the steel sections is strongest at the beginning of the spreading of the same and where useful in the matter of keeping the mouth of the net or bag closed for the purpose stated, this elastic action of the sections diminishing as they recede, as appears in Fig. 10, and wholly disappearing when in the complete hoop form shown in Fig. 2.

As above stated, when the hoop sections are brought into the form of a hoop, the net is evenly distributed around the hoop forming a circular mouth for the net, as will be evident from Figs. 1 and 6. When the device is not in use, with the hoop in its collapsed form, as seen in Fig. 5, said collapsed hoop, with the net and the detachable sections of the handle, may all be rolled into a small compact package for conveniently handling and carrying, the collapsed hoop and the sections of the handle all being made about of the same length.

Modifications in detail may be resorted to without departing from the spirit of the invention or sacrificing any of its advantages.

What is claimed as new is:—

1. In a net, a hoop formed of sections pivotally united at one end to fold flat against each other, interengaging means at the other end embodying a plate with overturned opposite edges and affixed to the end of one of the hoop sections, and means carried by the end of the other section and serving as a means of attachment of a handle.

2. In a net, a hoop formed of sections, pivotally united at one end to fold flat against each other, interengaging means at the other end embodying a plate with overturned opposite edges and affixed to the end of one of the hoop sections, means carried by the end of the other section and serving as a means of attachment of a handle, and a channeled member embracing the pivoted ends of the sections.

3. In a net, a hoop formed of sections pivotally united at one end to fold flat against each other, interengaging means at the other end embodying a plate with overturned opposite edges and affixed to the end of one of the hoop sections, means carried by the end of the other section and serving as a means of attachment of a handle, and means on the handle for holding the latter at any desired angle relative to the hoop.

4. In a net, two pivotally united sections, a plate having an opening and formed with overturned top and bottom edges fixed to the free end of one section, and a screw fixed to the free end of the other section and engageable through said opening in said plate.

5. In a net, pivotally united sections, a plate having an opening and formed with overturned top and bottom edges, said plate being fixed to the free end of one section, a screw fixed to the free end of the other section and engageable over said opening in said plate, and a plate fixed to the other section and receivable between said overturned top and bottom edges.

6. In a net, pivotally united sections, a plate having an opening and formed with overturned top and bottom edges, said plate being fixed to the free end of one section, a screw fixed to the free end of the other section and engageable over said opening in said plate, and a plate fixed to the other section and receivable between said overturned top and bottom edges, the pivotal connection between said sections comprising a channel member covering the overlapped united ends of said sections.

7. In a net, a hoop having a projecting screw, and means engageable with said screw for supporting a handle, said means being formed in jointed overlapped sections and a screw passing through the overlapped ends and forming a pivot on which they may turn, the abutting faces of said sections having corrugations and means for holding said sections in angular positions.

In witness whereof, I have hereunto set my hand this 9th day of July, 1909, in the presence of two subscribing witnesses.

JOHN F. FROMM.

Witnesses:
  E. B. WHITMORE,
  A. M. WHITMORE.